US007903843B2

(12) United States Patent
Sawaki et al.

(10) Patent No.: US 7,903,843 B2
(45) Date of Patent: Mar. 8, 2011

(54) SYSTEM, PROGRAM, AND APPARATUS FOR IMAGE PROCESSING

(75) Inventors: Masaru Sawaki, Niwa-gun (JP); Masatoshi Aboh, Toyota (JP); Takemi Ueno, Okazaki (JP); Yoshinori Watanabe, Chita-gun (JP); Hidehiko Kawakami, Nagoya (JP)

(73) Assignee: DENSO CORPORATION, Kariya (JP)

( * ) Notice: Subject to any disclaimer, the term of this patent is extended or adjusted under 35 U.S.C. 154(b) by 1015 days.

(21) Appl. No.: 11/727,602

(22) Filed: Mar. 27, 2007

(65) Prior Publication Data

US 2007/0230745 A1 Oct. 4, 2007

(30) Foreign Application Priority Data

Mar. 31, 2006 (JP) ................................ 2006-097924

(51) Int. Cl.
*G06K 9/00* (2006.01)
*G08G 1/16* (2006.01)

(52) U.S. Cl. .......................... 382/104; 382/291; 701/301

(58) Field of Classification Search .................. 382/103, 382/104, 106, 107, 154, 168, 178, 203, 209, 382/232, 256, 274, 276, 286–302, 305; 340/932.2, 340/435; 348/113; 701/301

See application file for complete search history.

(56) References Cited

U.S. PATENT DOCUMENTS

| | | | | |
|---|---|---|---|---|
| 6,370,475 | B1 * | 4/2002 | Breed et al. | 701/301 |
| 6,768,944 | B2 * | 7/2004 | Breed et al. | 701/301 |
| 6,819,231 | B2 * | 11/2004 | Berberich et al. | 340/435 |
| 6,917,378 | B2 * | 7/2005 | Weis et al. | 348/113 |
| 7,375,651 | B2 * | 5/2008 | Shimazaki et al. | 340/932.2 |
| 7,592,928 | B2 * | 9/2009 | Chinomi et al. | 340/932.2 |

FOREIGN PATENT DOCUMENTS

| | | |
|---|---|---|
| DE | 19741896 | 4/1999 |
| JP | A-2003-104149 | 4/2003 |
| JP | A-2004-254219 | 9/2004 |

OTHER PUBLICATIONS

Office Action dated Sep. 12, 2008 in corresponding German patent application No. 10 2007 015 498.6-31 (and English translation).

* cited by examiner

*Primary Examiner* — Seyed Azarian
(74) *Attorney, Agent, or Firm* — Posz Law Group, PLC

(57) ABSTRACT

An image processing apparatus uses a bird's eye image for supporting a backing operation of a vehicle for parking. The bird's eye image is processed to display an area view that at least includes a parking lot captured in the image. Then, the area view is displayed in a display space in a display unit of the image processing apparatus for representing a parking area and related information. In this manner, the area view excludes unnecessary part from the bird's eye image for effectively providing a visual support for the backing operation by a driver of the vehicle.

10 Claims, 3 Drawing Sheets

SYSTEM, PROGRAM, AND APPARATUS FOR IMAGE PROCESSING

CROSS REFERENCE TO RELATED APPLICATION

This application is based on and claims the benefit of priority of Japanese Patent Application No. 2006-97924 filed on Mar. 31, 2006, the disclosure of which is incorporated herein by reference.

FIELD OF THE INVENTION

The present invention generally relates to a driving support system and apparatus for use in a vehicle.

BACKGROUND INFORMATION

In recent years, various techniques for assisting a backward parking operation of a vehicle based on a captured image have been proposed. One of the techniques uses a bird's eye view based on a camera-captured image of a rear view of a vehicle selectively displayed for an assistance of the backward parking operation as disclosed in Japanese patent document JP-A-2004-254219.

However, the bird's eye processed rear view of the vehicle was not always helpful for the backward parking operation due to its visibility on a display unit. That is, the bird's eye view usually includes various objects other than a parking lot (e.g., a square area marked on a ground), thereby being distracting in terms of guiding driver's attention to the parking lot itself. In other word's, how to appropriately attract the driver's attention to the parking lot itself has been a problem under consideration.

SUMMARY OF THE INVENTION

In view of the above and other problems, the present invention provides an image processing technique that serves an improved visibility in an image presented for a driver who is involved in a driving operation.

An image processing apparatus for use in a vehicle includes an image capture unit for capturing an image of vehicle environment, an image processing unit for generating a bird's eye image based on the image captured by the image capture unit, a driving condition detection unit for detecting a driving condition of the vehicle, a positioning unit for positioning a parking area in the bird's eye image generated by the image processing unit when the driving condition of the vehicle detected by the driving condition detection unit is a backing for parking, a parking image generation unit for generating a parking image that includes an area view based on the parking area positioned by the positioning unit in the bird's eye image, and a display unit for displaying the parking image on a display screen.

The image processing apparatus of the present invention uses a camera captured image for generating a bird's eye image of a parking area, and examines the bird's eye image for positioning the parking area in the camera captured image when the vehicle is backing for parking in the parking area. Further, the bird's eye image is processed to navigate the vehicle to the parking area, and the processed bird's eye image is displayed on a display unit. In this manner, the bird's eye image of the parking area is tailored to the area view that is necessary for navigating the vehicle by backing into the parking area. Therefore, the area view includes only a necessary part of the bird's eye image, and prevents distraction of driver's attention by excluding an unnecessary part from the bird's eye image originally captured by a camera. In other words, the image processing apparatus improves visibility of the bird's eye image by filtering the originally captured image for preventing distraction of the driver being involved in a driving operation.

A system and program for providing a function of the image processing apparatus are devised substantially in the same manner as the image processing apparatus. Therefore, details of the system and program are omitted from the description.

BRIEF DESCRIPTION OF THE DRAWINGS

Other objects, features and advantages of the present invention will become more apparent from the following detailed description made with reference to the accompanying drawings, in which.

DETAILED DESCRIPTION

Preferred embodiments of the present invention are described with reference to the accompanying the drawings.

Figure 1:
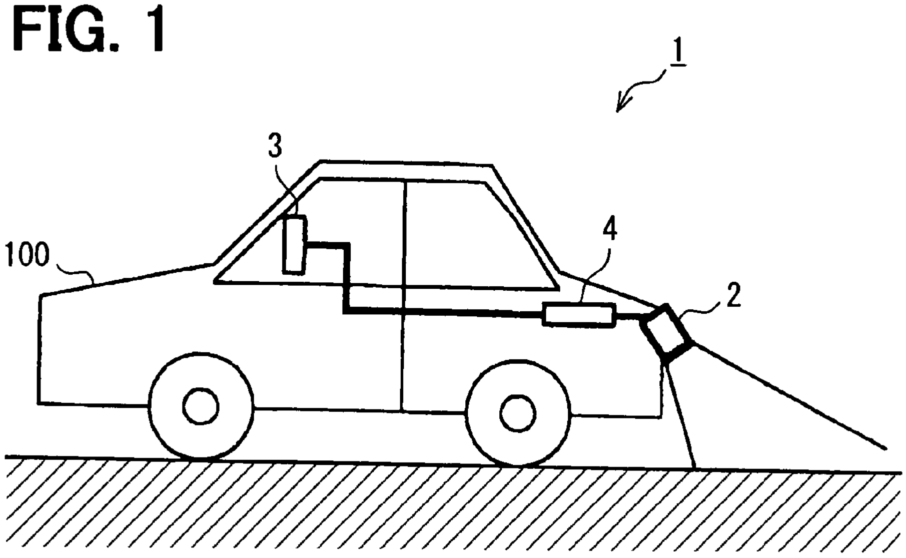
FIG. 1 shows an illustration of an image processing system in an embodiment of the present disclosure.

FIG. 1 shows an illustration of an image processing system 1 in an embodiment of the present disclosure. The system 1 includes a camera 2 disposed on a rear side of a vehicle 100, a display unit 3 disposed in a room of the vehicle 100, a image processor 4 that connects the camera 2 and the display unit 3, and the like.

The display unit 3 has a rectangular screen for displaying an image. The screen has a longer vertical side relative to a horizontal side. The image processor 4 displays a processed image on the display unit 3 based on an image captured by the camera 2. The image processor 4 is a well-known type of a computer system having a CPU, a memory and the like.

Figure 2:
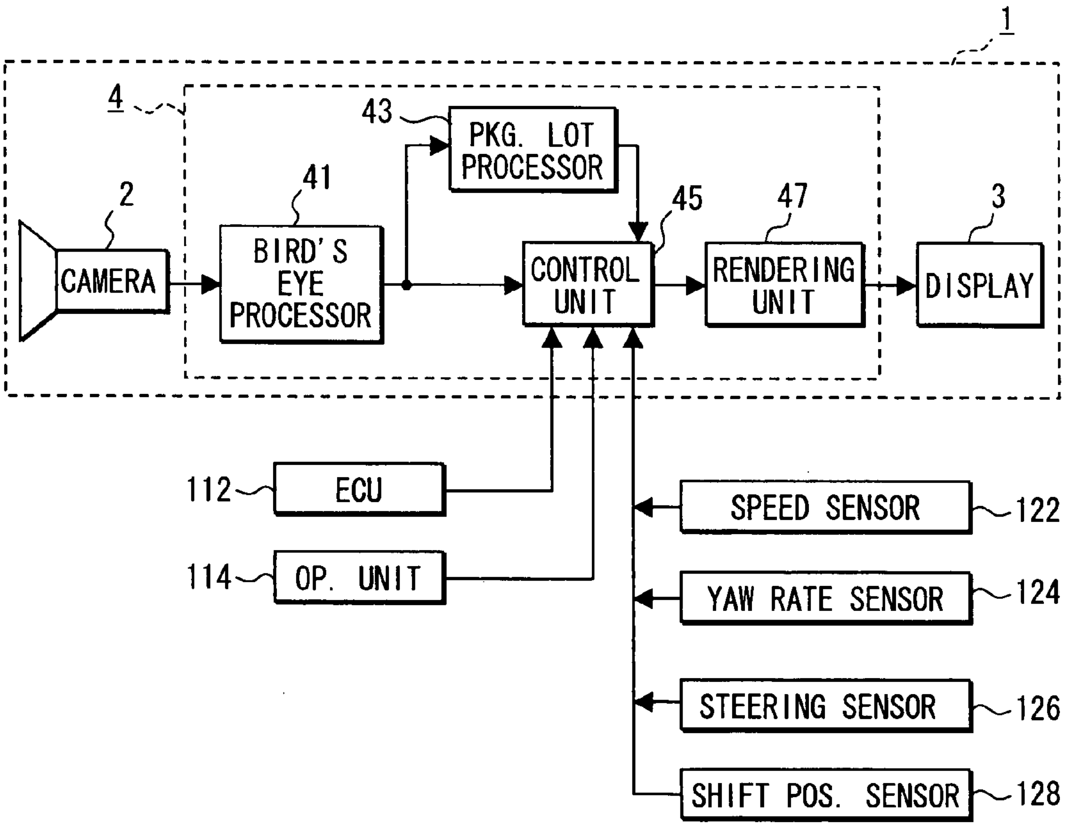
FIG. 2 shows a block diagram of the image processing system in the embodiment.

The image processor 4 includes, as shown in FIG. 2, a bird's eye processor 41, a parking lot processor 43, a control unit 45, a rendering unit 47, and the like.

The bird's eye processor 41 generates bird's eye image data for representing a bird's eye image that shows a bird's eye view of the vehicle 100 based on a processing of the image data captured by the camera 2. The processing of the image data in the processor 41 includes coordinate conversion or the like.

The parking lot processor 43 identifies a parking lot (e.g., a marked area on the ground) in the bird's eye image as a parking area for the vehicle 100 by performing an image processing on the bird's eye image data.

The control unit 45 generates area image based on the bird's eye image data from the processor 41, an identification result from the processor 43, and various information and instructions from other devices. The control unit 45 receives information and instructions from, for example, an ECU 112 for controlling a vehicle motion, an operation unit 114 for operating the image processor 4 based on user inputs, a speed sensor 122 for detecting a vehicle speed of the vehicle 100, a yaw rate sensor 124 for detecting a yaw rate of the vehicle 100, a steering sensor 126 for detecting a steering angle of the vehicle 100, a shift position sensor 128 for detecting a shift position of a transmission, and the like.

The rendering unit 47 renders a display image to be displayed on the display unit 3 based on the image data from the processor 41, and the image data from the control unit 45.

Figure 3:
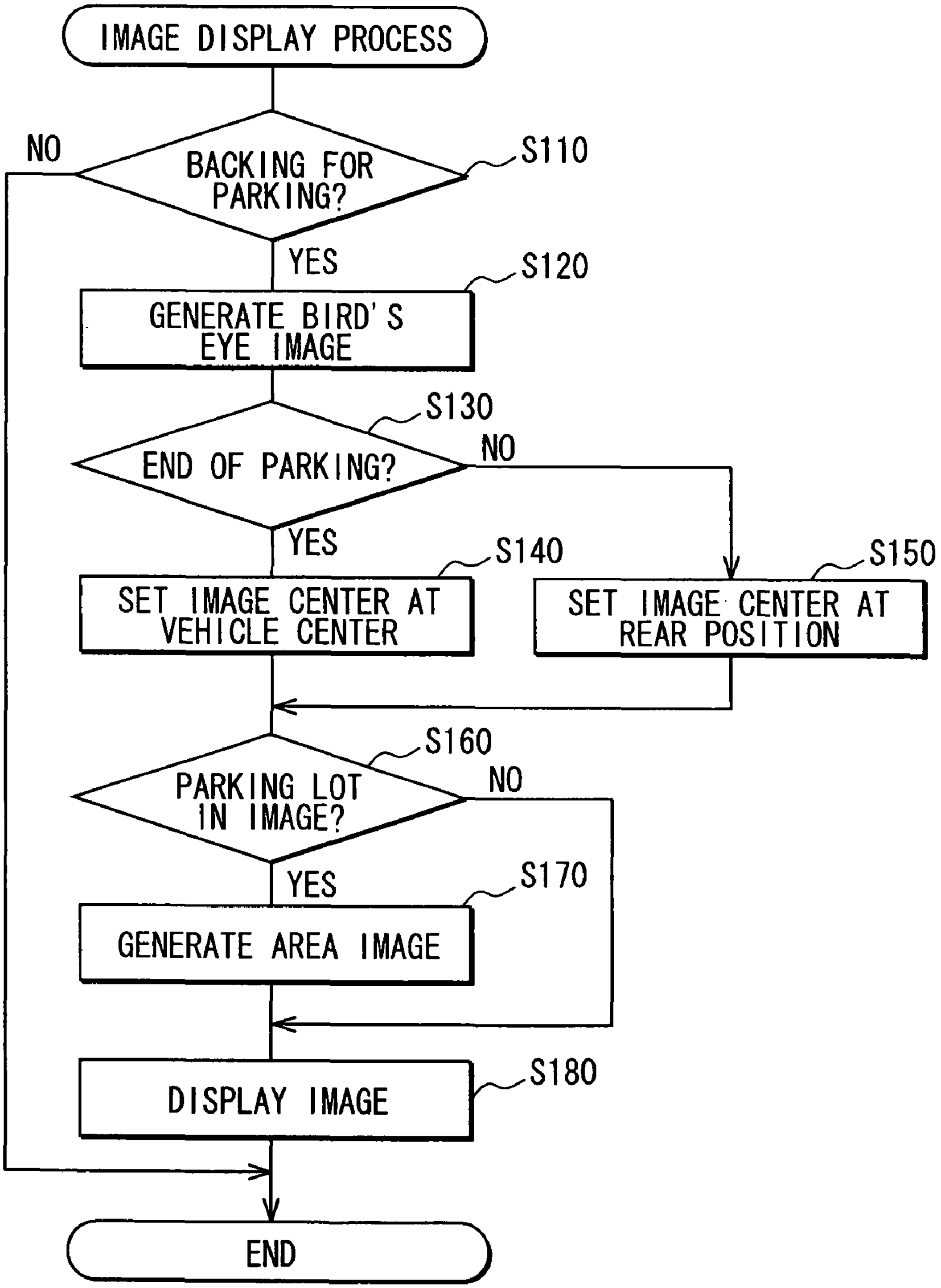
FIG. 3 shows a flowchart of an image display process in the image processing system.

FIG. 3 shows a flowchart of an image display process in the image processor 4 of the image processing system 1. The image display process repeats itself when an operation of the image processor 4 is started.

In step S110, the process determines whether the vehicle 100 is backing for parking. In this case, the process determines that the vehicle 100 is backing when a shift position of a transmission is put in a back position.

The process concludes itself when the vehicle 100 is not backing (step S110: NO). That is, the process waits for the backing operation of the vehicle 100.

The process proceeds to step S120 when the vehicle 100 is backing (step S110: YES).

Figure 4A:
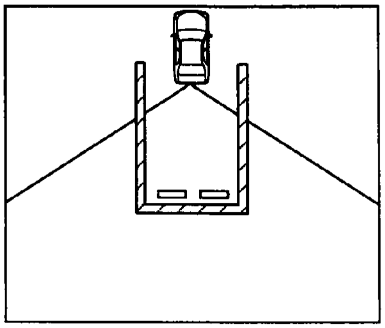
FIGS. 4A and 4B show illustrations of bird's eye views used in the image processing system.
Figure 4B:
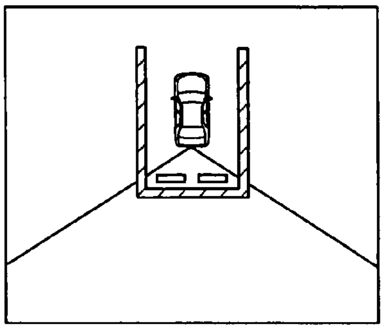

In step S120, the process generates a bird's eye image data for representing a bird's eye image based on an image captured by the camera 2. In this case, the bird's eye image data represents a bird's eye image of a square area that is centered around a predetermined distance in a rear of the vehicle 100. FIGS. 4A and 4B show illustrations of the bird's eye images represented by the image data. The image data processing based on the camera captured image is a well-known process, and the description of the processing is omitted in this description.

In step S130, the process determines whether the vehicle 100 is ending the parking operation. In this case, the process determines that the parking operation is close to its end when the speed of the vehicle 100 decreases lower than a predetermined speed based on the speed detected by the speed sensor 122 after detecting that the vehicle 100 is baking for parking. The ending of the parking may also be determined based on, for example, a predetermined period of vehicle operation at a backing speed that is lower than the predetermined speed.

The process proceeds to step S140 when the vehicle 100 is ending the backing for parking (step S130: YES).

In step S140, the process sets a center of the bird's eye image data to be displayed on the display unit 3 in subsequent processes at the center of the vehicle 100. That is, the bird's eye image on the display unit 3 always displays the vehicle 100 at its center.

The process proceeds to step S150 when the vehicle 100 is not ending the backing for parking (step S130: NO).

In step S150, the process sets the center of the bird's eye image data to be displayed on the display unit 3 in the subsequent processes at a predetermined distance in a rear of the vehicle 100.

Then, in step S160, the process determines whether the parking lot is included in the bird's eye image data. The image is examined by the parking lot processor 43 in this step, and the parking lot is marked by using a parking frame 200 (described later).

The process proceeds to step S180 after generation of an area image data to be displayed on the display unit 3 based on the parking lot determined in step S160 and the position of the image center determined either in step S140 or step S150. More practically, the bird's eye image data generated in step S120 is processed to at least include the parking lot determined in step S160 with the center position of the image set to the vehicle center or a rear field of the vehicle 100. The processed image is fitted to a screen size of the display unit 3. In other words, a display area to be displayed on the display unit 3 is extracted from the bird's eye image.

Figure 5A:
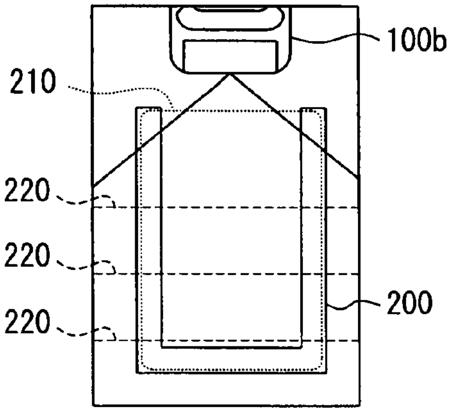
FIGS. 5A and 5B show illustrations of a parking lot image displayed on a display unit of the image processing system.
Figure 5B:
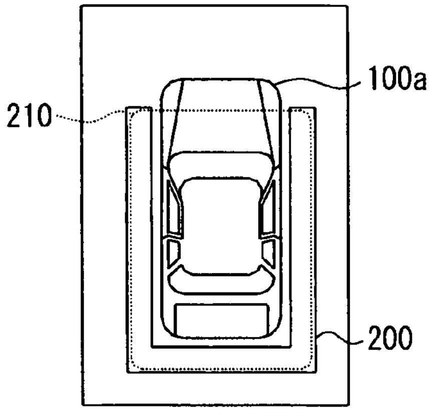

FIGS. 5A and 5B show illustrations of a parking lot image displayed on the display unit 3 of the image processing system 1. As shown in FIGS. 5A and 5B, a parking lot 210 in the extracted image includes a predetermined amount of a surrounding area. The predetermined amount of the surrounding area in the image is determined based on a display margin for including an outer edge of the parking frame 200 (described later) in the extracted image. Further, the predetermined amount of the surrounding area on both sides of the vehicle 100 is determined as a door open space for the vehicle 100 parked in the parking lot 210.

The process proceeds to step S180 without a processing in step S170 when the parking lot is not included in the image (step S160: NO).

In step S180, the process displays the area image on the display unit 3. In this case, the area image generated in step S170, or the image generated in step S120, is fitted to the screen size of the display unit 3 according to the determination result in step S160.

The image displayed on the display unit 3 includes the parking frame 200 that surrounds the parking lot 210, and the parking frame 200 is in combination with a rear part 100*b* of the vehicle 100 as shown in FIG. 5A when the image center is positioned in the rear of the vehicle 100 in step S150. The parking lot 210 is divided by gauge lines 220 that divide a longitudinal length of the parking lot 210 equally into plural intervals. On the other hand, when the image center is positioned at the center of the vehicle 100, the displayed image includes an entire part 100*a* of the vehicle 100 in the parking lot 210 with the parking frame 200 as shown in FIG. 5B.

After displaying the image in step S180, the process concludes itself.

The advantages of the present embodiment are briefly described in the following. First, the image processor 4 processes the captured image for displaying the bird's eye image with the parking lot 210 framed with the parking frame 200 in a fitting manner on the display unit 3. Therefore, the parking lot 210 is suitably displayed in the extracted image as shown in FIGS. 5A and 5B. That is, the parking lot 210 occupies a large area in the extracted image for easy recognition by the driver of the vehicle 100. In other words, by reducing a surrounding area of the parking lot 210 to a minimum in the extracted image, attention of the driver of the vehicle 100 is appropriately guided to the parking lot 210. As a result, the visibility of the driver is improved in terms of the parking support operation by the image processing system 1, and provision of unnecessary distraction for the driver is prevented.

Further, the image displayed on the display unit 3 selectively includes a part of the vehicle 100 or an entire part of the vehicle 100 depending on the phase of the parking operation. In this manner, the parking operation by the driver of the vehicle 100 is appropriately supported by the image processing system 1 all through the parking operation. In addition, the condition of the parked vehicle 100 is easily determined based on the display of the parking frame 200. That is, whether the parked vehicle 100 is aligned with the parking lot 210, whether the door open space is sufficiently provided or other condition of the vehicle 100 is easily recognized by the driver only at a glance on the display unit 3.

Although the present invention has been fully described in connection with the preferred embodiment thereof with reference to the accompanying drawings, it is to be noted that various changes and modifications will become apparent to those skilled in the art.

For example, the camera 2, the display unit 3, and the image processor 4 may be provided as an integrated unit in stead of separate units.

Further, the condition in step S110 may be replaced with a condition that a predetermined time has passed after changing the shift position to the back position, a condition that a pedal is operated in a predetermined manner after the shift is changed to the back position, a condition that the speed of the vehicle 100 increases to a predetermined value after the shift is changed to the back position, or the like.

Furthermore, the bird's eye image generated at a timing of the backing (i.e., at a timing between step S110 and step S120) may be generated at a different timing. That is, for example, the bird's eye image may be generated at a predetermined interval irrespective of the backing timing of the vehicle 100 for use in the subsequent processing.

Furthermore, the size of the image displayed in step S180 may be different from the fitting size of the screen of the display unit 3.

Furthermore, the condition in step S130 for determining the ending of the parking may be replaced with a condition that a predetermined time has passed after the start of the backing for the parking, a condition that the shift is changed to a parking position based on a detection result by the shift position sensor 128.

Furthermore, the predetermined amount of the surrounding area in step S170 may be changed to an amount that is arbitrarily set according to a type of the vehicle 100.

Figure 6:
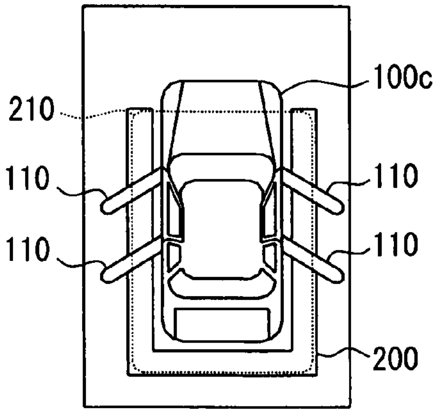
FIG. 6 shows an illustration of the parking lot image used in another embodiment.

Furthermore, the image of the vehicle may look as an illustration in FIG. 6 when the center of the image is set in step S140. That is, a vehicle image 100*c* with its doors 110 opened for examining a door open space may be displayed in the image.

Furthermore, in step S160, the position of the parking lot 210 may be examined in addition to the inclusion of the parking frame 200. That is, the position of the parking lot 210 may be examined in terms of alignment with a longitudinal direction of the vehicle 100.

Such changes and modifications are to be understood as being within the scope of the present invention as defined by the appended claims.

What is claimed is:

1. An image processing apparatus for use in a vehicle comprising:

an image capture unit for capturing an image of vehicle environment;

an image processing unit for generating a bird's eye image based on the image captured by the image capture unit;

a driving condition detection unit for detecting a driving condition of the vehicle;

a positioning unit for positioning a parking area in the bird's eye image generated by the image processing unit when the driving condition of the vehicle detected by the driving condition detection unit is a backing for parking;

a parking image generation unit for generating a parking image that includes an area view based at least on a portion of the parking area positioned by the positioning unit in the bird's eye image and a portion of the vehicle;

a display unit for displaying the parking image on a display screen;

a parking operation detection unit for detecting one of an end and an ending of a parking operation based on the driving condition detected by the driving condition detection unit; and a center position setting unit for setting a center position of the bird's eye image based on a detection result of the parking operation detection unit, wherein the center position setting unit sets the center position of the bird's eye image to a center of the vehicle in the bird's eye image when the parking operation detected by the parking operation detection unit is one of the end and the ending of the parking operation, the center position setting unit sets the center position of the bird's eye image to a predetermined distance in a rear of the vehicle in the bird's eye image when the parking operation detected by the parking operation detection unit is not one of the end and the ending of the parking operation, and the parking image generation unit generates the parking image having the parking area included therein based on the bird's eye image that is centered at the center position set by the center position setting unit.

2. The image processing apparatus as in claim 1, wherein the parking image has a center position of the bird's eye image set to a predetermined distance in a rear of the vehicle in the bird's eye image, and the parking image includes the parking area.

3. The image processing apparatus as in claim 1, wherein the parking image has a center position of the bird's eye image set to a center of the vehicle in the bird's eye image, and the parking image includes the parking area.

4. The image processing apparatus as in claim 1, wherein the parking image has a center position of the bird's eye image set to a position of the parking area in the bird's eye image, and the parking image includes the image of the vehicle.

5. The image processing apparatus as in claim 1, wherein the display screen has a display area for displaying the parking image, and the parking image generated by the parking image generation unit takes a same shape as the display area to be fittingly displayed therein when the display area takes a rectangular shape with its longitudinal side longer than its lateral side in a driver's view.

6. The image processing apparatus as in claim 1, wherein the parking image generation unit generates the parking image by defining the area view that at least includes door open clearance for the vehicle when the vehicle is in the parking area.

7. The image processing apparatus of claim 1, wherein the parking image generation unit generates the parking image having a rear of the vehicle excluded from the bird's eye image when the bird's eye image is centered at the center position.

8. An image processing system for use in a vehicle comprising:

an image capture controlling unit for capturing an image of vehicle environment;

an image processing controlling unit for generating a bird's eye image based on the image captured by the image capture controlling unit;

a driving condition detection controlling unit for detecting a driving condition of the vehicle;

a positioning controlling unit for positioning a parking area in the bird's eye image generated by the image processing controlling unit when the driving condition of the vehicle detected by the driving condition detection controlling unit is a backing for parking;

a parking image generation controlling unit for generating a parking image that includes an area view based on the parking area positioned in the bird's eye image by the positioning controlling unit;

a display controlling unit for displaying the parking image on a display screen;

a parking operation detection unit for detecting one of an end and an ending of a parking operation based on the driving condition detected by the driving condition detection unit; and a center position setting unit for setting a center position of the bird's eye image based on a detection result of the parking operation detection unit, wherein the center position setting unit sets the center position of the bird's eye image to a center of the vehicle in the bird's eye image when the parking operation detected by the parking operation detection unit is one of the end and the ending of the parking operation, the center position setting unit sets the center position of the bird's eye image to a predetermined distance in a rear of the vehicle in the bird's eye image when the parking operation detected by the parking operation detection unit is not one of the end and the ending of the parking operation, and the parking image generation unit generates the parking image having the parking area included therein based on the bird's eye image that is centered at the center position set by the center position setting unit.

9. An image processing program for use in a vehicle, the program retrievably stored in a recoding medium for functionally operating a computer as an image processing apparatus, the program comprising steps of:

providing an image capture function for capturing an image of vehicle environment;

providing an image processing function for generating a bird's eye image based on the image captured by the image capture unit;

providing a driving condition detection function for detecting a driving condition of the vehicle;

providing a positioning function for positioning a parking area in the bird's eye image generated by the image processing function when the driving condition of the vehicle detected by the driving condition detection function is a backing for parking;

providing a parking image generation function for generating a parking image that includes an area view based on the parking area positioned in the bird's eye image by the positioning function;

providing a display function for displaying the parking image on a display screen of the computer;

providing a parking operation detection function for detecting one of an end and an ending of a parking operation based on the driving condition detected by the driving condition detection function; and providing a center position setting function for setting a center position of the bird's eye image based on a detection result of the parking operation detection function, wherein the center position setting function sets the center position of the bird's eye image to a center of the vehicle in the bird's eye image when the parking operation detected by the parking operation detection function is one of the end and the ending of the parking operation, the center position setting function sets the center position of the bird's eye image to a predetermined distance in a rear of the vehicle in the bird's eye image when the parking operation detected by the parking operation detection function is not one of the end and the ending of the parking operation, and the parking image generation unit generates the parking image having the parking area included therein based on the bird's eye image that is centered at the center position set by the center position setting unit.

10. The image processing program of claim 9, wherein the parking image generation unit generates the parking image having a rear of the vehicle excluded from the bird's eye image when the bird's eye image is centered at the center position.

* * * * *